United States Patent [19]

Maruyama

[11] Patent Number: 4,927,209
[45] Date of Patent: * May 22, 1990

[54] TRIM COVER FOR USE WITH SEATS IN VEHICLES

[75] Inventor: Hidekazu Maruyama, Ayase, Japan

[73] Assignee: Ikeda Bussan Co., Ltd., Ayase, Japan

[*] Notice: The portion of the term of this patent subsequent to Jan. 12, 2005 has been disclaimed.

[21] Appl. No.: 185,238

[22] Filed: Apr. 18, 1988

Related U.S. Application Data

[63] Continuation of Ser. No. 894,946, Aug. 8, 1986.

[30] Foreign Application Priority Data

Aug. 9, 1985 [JP] Japan .................. 60-122434

[51] Int. Cl.⁵ .............................................. A47C 7/74
[52] U.S. Cl. ..................................... 297/180; 297/219; 297/452
[58] Field of Search .................. 297/186, 219

[56] References Cited

U.S. PATENT DOCUMENTS

| | | | |
|---|---|---|---|
| 3,630,572 | 12/1971 | Homier | 297/218 |
| 3,727,980 | 4/1973 | Tischler | 297/452 |
| 4,379,352 | 4/1983 | Hauslein et al. | 297/452 |
| 4,558,905 | 12/1985 | Natori | 297/219 |
| 4,579,389 | 4/1986 | Shimbori et al. | 297/452 |
| 4,606,580 | 8/1986 | Yoshizawa | 297/DIG. 1 |
| 4,718,718 | 1/1988 | Maruyama | 297/180 |

Primary Examiner—Francis K. Zugel
Attorney, Agent, or Firm—Foley & Lardner, Schwartz, Jeffery, Schwaab, Mack, Blumenthal & Evans

[57] ABSTRACT

A trim cover for use with seats in vehicles and having an electric heater housed therein wherein its surface skin and base cloth are linearly joined with each other at the sitting areas of the trim cover in the longitudinal direction thereof to form an appropriate number of elongated sack-like portions between the surface skin and the base cloth, a pulling loop traverse the sack-like portions at the middle thereof is joined together with the surface skin and the base cloth, a pair of openings are formed at the middle of each of the sack-like portions which are closed by the pulling loop at the middle thereof, interposing the pulling loop between the paired openings, that portion of the pulling loop which corresponds to the width of each of the sack-like portions is cut away, leaving a piece of pulling loop at the border of the adjacent sack-like portions, each of band-like portions of the electric heater is inserted through its corresponding sack-like portion, passing over the pulling loop between the paired openings, and a pulling wire is passed through the pulling loop pieces each extending between the adjacent band-like portions of the electric heater.

6 Claims, 2 Drawing Sheets

TRIM COVER FOR USE WITH SEATS IN VEHICLES

This application is a continuation of application Ser. No. 894,946, filed Aug. 8, 1986.

BACKGROUND OF THE INVENTION

1. Field of the Invention

The present invention relates to a trim cover for use with seats in vehicles, said trim cover adapted to cover the cushion of a seat, and having wadding between its surface skin and base cloth, and an electric heater therein.

2. Description of the Prior Art

A conventional trim cover for use with seats in vehicles and having an electric heater therein is shown in FIGS. 1 and 2.

The trim cover 1 is divided to form a plurality of elongate sack-like portions 4 between its surface skin 2 and base cloth 3. A band-like portion 5a of the electric heater 5, whose length corresponds substantially to the whole length of each of the sack-like portions 4, is inserted into each of the sack-like portions 4. Loops 6 are arranged side by side in the transverse direction of the trim cover 1 and in front of the band-like portions 5a of the electric heater 5. When the trim cover 1 is to be attached to the seat cushion, a pulling wire 6a passed through the loops 6 is pulled downward together with another pulling wire 7a which passes through loops 7 arranged at the back of the trim cover 1, thereby forming grooved lines 8 and 9 at the front and back of the trim cover 1.

In this conventional trim cover, however, the loops 6 and 7 are separated from one another by the elongated band-like portions 5a of the electric heater 5 so that the distance between the grooved lines 8 and 9 is relatively long. The grooved line 8 is thus near the front end of the seat cushion and the position of the hip of the user, at which a load is applied, is romate from the grooved line 8. When the trim cover 1 is repeatedly used, therefore, its surface skin is loosened and the cushion cannot be shaped so as to make the user feel comfortable.

SUMMARY OF THE INVENTION

The present invention is therefore intended to eliminate the above-mentioned drawbacks.

Accordingly, an object of the present invention is to provide a trim cover for use with seats in vehicles wherein the grooved lines are formed at appropriate positions on the seat cushion to solve the above-mentioned problems.

This object of the present invention can be achieved by a trim cover for use with seats in vehicles, shaped to cover the cushion of a seat, sandwiching wadding between its surface skin and base cloth and housing an electric heater therein. The surface skin and the base cloth are linearly joined with each other in the longitudinal direction at that area of the trim cover where the driver or other person will sit so as to form an appropriate number of elongated sack-like portions between the surface skin and the base cloth of the trim cover. A pulling loop traverses the sack-like portions at the middle thereof and is joined with the surface skin and the base cloth. A pair of opening are formed at the middle of the sack-like portions at which the pulling loop is interposed between these openings. The portion of the pulling loop which corresponds to the width of each of the band-like portions of the electric heater is cut away, leaving a piece of pulling loop at the border of the adjacent sack-like portions. Each of the band-like portions of the electric heater is inserted through each of the sack-like portions and passed over the cut-away portion of the pulling loop between the paired openings of the sack-like portion. A pulling wire is passed under each pulling loop piece extending between the adjacent band-like portions of the electric heater.

When the trim cover is arranged as described above and the pulling wire which is passed through the pulling loop pieces at the middle of the sack-like portions is pulled downward, a grooved line can be formed remote from the front end of the seat cushion but an an appropriate position on the seat cushion, thereby preventing the surface skin from loosening and providing a comfortable seat. In addition, comfortable heating can be achieved in cold conditions to thereby enhance the comfort of the vehicle.

DETAILED DESCRIPTION OF THE PREFERRED EMBODIMENT

Figure 1:
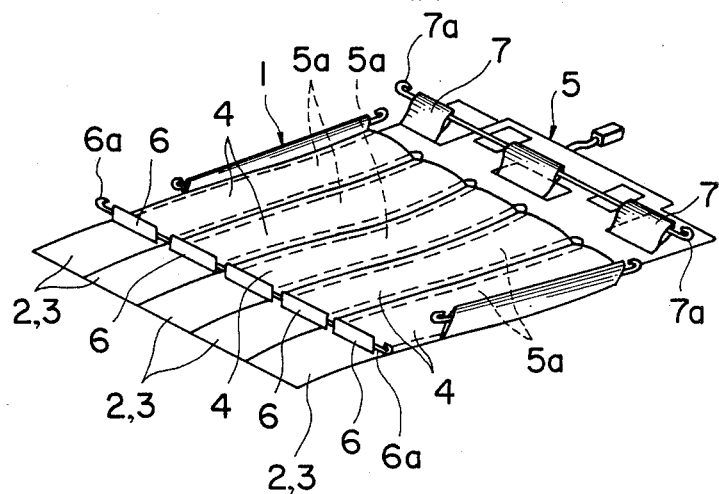
FIG. 1 is a perspective view showing an example of the conventional trim cover.
Figure 2:
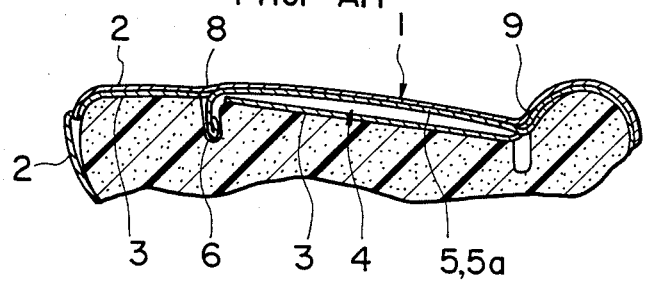
FIG. 2 is a sectional view showing a part of the seat cushion onto which the conventional trim cover is attached.
Figure 3:
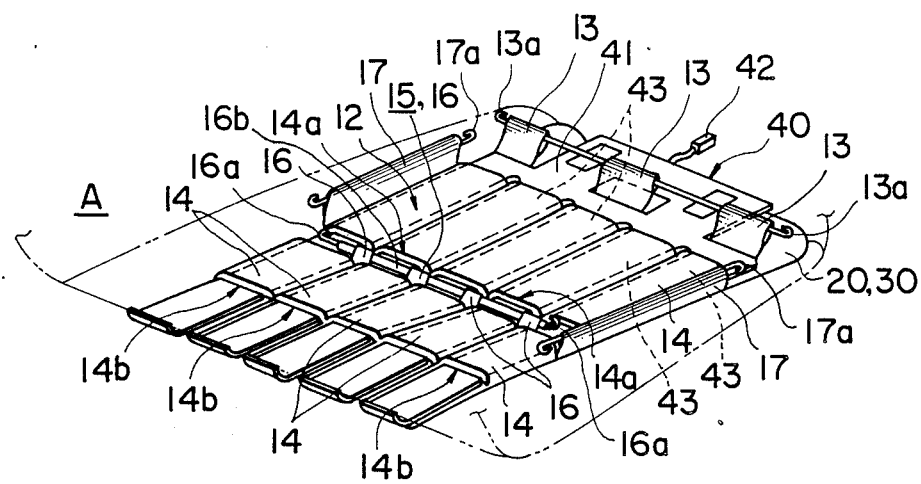
FIG. 3 is a perspective view showing an example of the trim cover according to the present invention.
Figure 4:
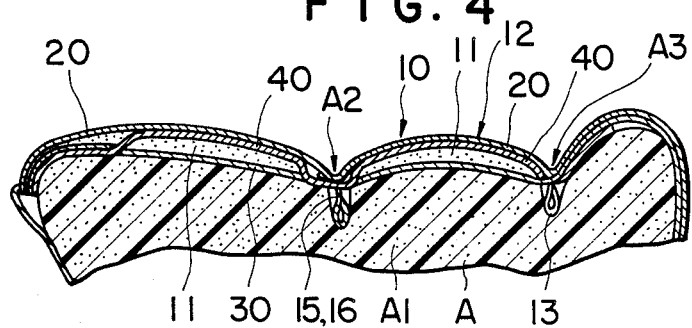
FIG. 4 is a sectional view showing a part of the seat cushion onto which the trim cover shown in FIG. 3 is attached.
Figure 5:
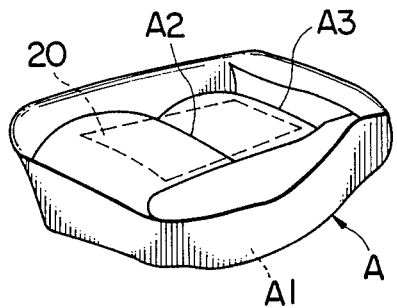
FIG. 5 is a perspective view showing the seat cushion.

FIGS. 3 through 5 show an embodiment of the present invention.

A trim cover 10 is shaped to cover a seat cushion (A) and wadding 11 is sandwiched between a surface skin 20 and a base cloth 30. Further, an electric heater 40 is housed, contacting the surface skin 20 tightly. The base of each of pulling loops 13 is sewn together with the surface skin 20 and the base cloth at the back of the surface skin 20 which corresponds to the back of that sitting area 12 of the trim cover 10 corresponding to the sitting area of the seat cushion (A). A pulling wire 13a can be passed through the pulling loops 13.

The surface skin 20 and the base cloth 30 are linearly sewn together at the sitting area of the trim cover 10 in the longitudinal direction thereof to form a plurality of elongated sack-like portions 14 between the surface skin 20 and the base cloth 30. A pulling loop 15 traverses the sack-like portions 14 at the middle thereof is sewn together with the surface skin 20 and the base cloth 30. A pair of openings 14a are formed at the middle of each of the sack-like portions 14, for interposing the pulling loop 15 between them.

That portion of the pulling loop 15 which corresponds to the width of each of the sack-like portions 14 is cut away, leaving a piece of pulling loop 16 at the border of the adjacent sack-like portions 14, and a pulling wire 16a can be passed through the pulling loop pieces 16 arranged side by side in the transverse direction of the trim cover 10.

Side pulling loops 17 are sewn together with the surface skin 20 and the base cloth 30 at both sides of the sitting area 12 of the trim cover 10 and a pulling wire 17a can be passed through each of these pulling loops 17.

An electric heater 40 comprises a heating wire in an outer skin and three heating wires collected at a back end 41 and connected to a plug 42. The pulling loops 13 are passed through openings or cut-away portions, at the back end 41 of the trim cover 10. Each of band-like portions 43 of the electric heater 40 extends forward from the back and 41 and is inserted through its corresponding sack-like portion 14 passed over the pulling loop 15 between the paired openings 14a and projected from an opening 14b at the foremost end of the sack-like portion 14 until it has extended to the foremost end of the sitting area 12.

When the trim cover 10 is to be attached to the seat, its sitting area 12 is spread to correspond to the sitting area of the seat cushion (A) and to cover a cushion pad A1. Trim cover 10 is then fixed at its outer circumferential rim; the pulling wires 13a, 16a and 17a are pulled downward together with their loops 13, 16 and 17; and hooked to a cushion frame (not shown).

The surface skin 20 is thus pulled inward by the pulling wires 13a and 16a through their loops 13 and 16, and grooved lines A2 and A3 can be formed at appropriate front and back positions on the seat cushion (A).

The driver or another person can sit on the trim cover or seat, with his thighs supported by a swelled portion in front of the grooved line A2 and his hip by another swelled portion between the grooved lines A2 and A3. If necessary, warmth can be provided by heating the electric heater 40 through the plug 42.

The wire 16a is covered with rubber 16b. This is intended to prevent the wire 16a from striking against and rubbing with the heater 40 when the driver or other person sits on the trim cover 10.

Although the present invention has been described with reference to the preferred embodiment, it should be understood that the present invention is not limited to this embodiment but various changes and modifications can be made without departing from the scope and spirit of the present invention.

What is claimed is:

1. A trim cover for covering a heat cushion of a seat in a vehicle, comprising:
   a surface skin;
   a base cloth connected to said surface skin;
   wadding sandwiched between said surface skin and said base cloth;
   an electric heater comprising a plurality of band-like portions;
   a plurality of elongated sack-like portions formed between said surface skin and said base cloth, each sack-like portion being separated from adjacent sack-like portions by seams which bind said surface skin and said base cloth together, each sack-like portion receiving one of said plurality of band-like electric heater portions and having openings formed intermediate its length and extending partially across its width, said openings being aligned adjacent one another;
   pulling loop means constructed by a plurality of pulling loop pieces provided at borders of each adjacent pair of sack-like portions at an intermediate portion thereof and being joined together with said surface skin and said base cloth at said borders of each adjacent pair of sack-like portions; and
   a pulling wire passed under said pulling loop pieces for securing the trim cover to the seat cushion.

2. A trim cover as claimed in claim 1, wherein said pulling wire is covered with rubber to prevent harmful contact with said electric heater.

3. A trim cover as claimed in claim 1 and further comprising a plurality of side pulling loops sewn together with said surface skin and said base cloth, each of said side pulling loops being positioned at an outer edge of one of the outermost of said sack-like portions and having a pulling wire passed through it for attachment to the seat.

4. A seat for a vehicle, comprising:
   a seat cushion; and
   a trim cover for covering said seat cushion comprising a surface skin, a base cloth connected to said surface skin, wadding sandwiched between said surface skin and said base cloth, an electric heater comprising a plurality of band-like portions, a plurality of elongated sack-like portions formed between said surface skin and said base cloth, each sack-like portion being separated from adjacent sack-like portions by seams which bind said surface skin and said base cloth together, each sack-like portion receiving one of said plurality of band-like electric heater portions and having an opening formed intermediate its length and extending partially across its width, said openings being aligned adjacent one another, pulling loop means constructed by a plurality of pulling pieces provided at borders of each adjacent pair of sack-like portions at an intermediate portion thereof and being joined together with said surface skin and said base cloth at said borders of each adjacent pair of sack-like portions, and a pulling wire passed through said pulling loop pieces for securing the trim cover to the seat cushion.

5. A seat as claimed in claim 4, wherein said pulling wire is covered with rubber to prevent harmful contact with said electric heater.

6. A seat as claimed in claim 4 and further comprising a plurality of side pulling loops sewn together with said surface skin and said base cloth, each of said side pulling loops being positioned at an outer edge of one of the outermost of said sack-like portions and having a pulling wire passed through it for attachment to the seat.

* * * * *